United States Patent
Reynolds et al.

(10) Patent No.: US 8,751,131 B2
(45) Date of Patent: Jun. 10, 2014

(54) CONTROL METHOD AND APPARATUS FOR A VEHICLE

(75) Inventors: Timothy Reynolds, Hampton Magna (GB); Paul Beever, Rugby (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 0 days.

(21) Appl. No.: 13/309,969

(22) Filed: Dec. 2, 2011

(65) Prior Publication Data

US 2012/0197506 A1    Aug. 2, 2012

(30) Foreign Application Priority Data

Dec. 2, 2010   (GB) .................................. 1020440.2

(51) Int. Cl.
   *B60W 30/02* (2012.01)
(52) U.S. Cl.
   USPC ................... 701/84; 701/82; 701/90; 701/70; 701/71; 701/74; 361/238
(58) Field of Classification Search
   None
   See application file for complete search history.

(56) References Cited

U.S. PATENT DOCUMENTS

| | | | |
|---|---|---|---|
| 4,682,667 A | 7/1987 | Hosaka | |
| 4,763,912 A | 8/1988 | Matsuda | |
| 5,159,991 A * | 11/1992 | Tsuyama et al. | 180/197 |
| 5,163,530 A * | 11/1992 | Nakamura et al. | 180/197 |
| 5,351,776 A | 10/1994 | Keller et al. | |
| 5,357,435 A * | 10/1994 | Yasuda | 701/83 |
| 5,373,447 A | 12/1994 | Howes et al. | |
| 5,463,551 A * | 10/1995 | Milunas | 701/91 |
| 5,539,643 A | 7/1996 | Yamamoto et al. | |
| 5,747,682 A * | 5/1998 | Hirano | 73/115.07 |
| 6,023,650 A | 2/2000 | Yamamoto et al. | |
| 6,236,926 B1 * | 5/2001 | Naitou | 701/70 |
| 6,298,297 B1 * | 10/2001 | Colby et al. | 701/85 |
| 6,618,660 B2 * | 9/2003 | Walenty et al. | 701/71 |
| 6,853,902 B2 * | 2/2005 | Miller et al. | 701/82 |
| 7,039,517 B2 * | 5/2006 | Rudd, III | 701/71 |
| 7,101,313 B2 * | 9/2006 | Kresse et al. | 477/115 |
| 7,140,459 B2 * | 11/2006 | Shimizu | 180/65.225 |
| 7,499,787 B2 * | 3/2009 | Hrovat et al. | 701/82 |
| 7,765,050 B2 * | 7/2010 | Hrovat et al. | 701/82 |

(Continued)

FOREIGN PATENT DOCUMENTS

DE    3933652 A1    4/1991

OTHER PUBLICATIONS

Search Report under Section 17 for Application No. GB1020440.2 dated Jun. 17, 2011.

(Continued)

*Primary Examiner* — Thomas Tarcza
*Assistant Examiner* — Richard Goldman
(74) *Attorney, Agent, or Firm* — Carlson, Gaskey & Olds (57) ABSTRACT

In an aspect of the invention there is provided a control method for a vehicle travelling on a surface, the vehicle having a vehicle powertrain for generating and delivering power to the vehicle wheels, the method including: measuring one or more parameters associated with motion of the vehicle on the surface; comparing the or each of the measured parameters with a predetermined threshold for said measured parameter that is indicative of a level at which wheel slip of the vehicle may occur; and in circumstances in which one or more of the measured parameters exceeds the predetermined threshold, controlling the torque applied by the powertrain to the vehicle wheels to prevent wheel slip.

28 Claims, 2 Drawing Sheets

(56) References Cited

U.S. PATENT DOCUMENTS

| | | | | |
|---|---|---|---|---|
| 7,778,747 | B2* | 8/2010 | Hawkins et al. | 701/22 |
| 7,792,625 | B2* | 9/2010 | Hrovat et al. | 701/82 |
| 8,050,822 | B2* | 11/2011 | Takenaka et al. | 701/41 |
| 8,155,852 | B2* | 4/2012 | Takenaka et al. | 701/70 |
| 8,175,785 | B2* | 5/2012 | Turski et al. | 701/82 |
| 8,180,547 | B2* | 5/2012 | Prasad et al. | 701/71 |
| 8,200,408 | B2* | 6/2012 | Turski et al. | 701/87 |
| 2001/0014844 | A1* | 8/2001 | Wandel | 701/82 |
| 2008/0183353 | A1* | 7/2008 | Post et al. | 701/42 |
| 2008/0234911 | A1* | 9/2008 | Matsuno et al. | 701/82 |
| 2008/0262692 | A1* | 10/2008 | Kogure et al. | 701/90 |
| 2009/0171526 | A1* | 7/2009 | Takenaka et al. | 701/29 |
| 2010/0076660 | A1* | 3/2010 | Folk | 701/84 |
| 2011/0307129 | A1* | 12/2011 | Yu et al. | 701/22 |

OTHER PUBLICATIONS

Zanten Van A et al: "FDR—Die Fahrdynamik-Regelung Von Bosch," ATZ Automobiltechnische Zeitschrift, Vieweg Publishing, Wiesbade, DE, vol. 96, No. 11, Nov. 1, 1994, pp. 674-678, 683, XP000478694, ISSN: 0001-2785.

Rouquette J: "Controler L'Abs Et L'Asr," Revue Technique Diesel, Etai, Boulogne Billancourt, FR, vol. 32, No. 192, Mar. 1, 1995, pp. 41-46, XP000497372, ISSN: 0037-2579.

"Le Controle De L'Abs Et L'Asr. Sur Les Vehicules De La Gamme Mercedes-Benz," Revue Technique Diesel, Etai, Boulogne Billancourt, FR. No. 186, Mar. 1, 1993, pp. 24-39, XP000440560, ISSN: 0037-2579.

"La Technologie ABS/ASR De Teves," Ingenieurs De L'Automobile, Editions VB, Garches, FR, No. 679, Mar. 1, 1993, pp. 12-13, XP000364092, ISSN: 0020-1200.

Lichnofsky R et al: "ABS, ASR und MSR DER Neuen S-Klasse," ATZ Automobiltechnische Zeitschrift, Vieweg Publishing, Wiesbaden, DE, vol. 94, No. 6, Jun. 1, 1992, pp. 322-324, 327, XP000275680, ISSN: 0001-2785.

Maisch W et al: "Die Antriebsschlupfregelung ASR—Eine Konsequente Erweiterung Des ABS," ATZ Automobiltechnische Zeitschrift, Vieweg Publishing, Wiesbaden, DE, vol. 90, No. 2, Feb. 1, 1988, pp. 57-61, XP000027584; ISSN: 0001-2785.

Extended European Search Report for Application No. EP 11 19 1701 dated Mar. 22, 2012.

* cited by examiner

CONTROL METHOD AND APPARATUS FOR A VEHICLE

CROSS-REFERENCE

This application claims priority from UK Patent Application No. GB 1020440.2 filed 2 Dec. 2010, the entire contents of which are expressly incorporated herein by reference.

FIELD OF THE INVENTION

The present invention relates to a control method for a vehicle for preventing slip of the driven wheels, and to an apparatus for implementing said control method.

BACKGROUND

Traction control systems, also known as anti-slip regulation (ASR) systems, are used on vehicles to prevent loss of traction of the driven wheels so as to maintain control of the vehicle and to prevent deterioration of the accelerating performance due to longitudinal slip of the driving wheels. Traction control is necessary, for example, when excessive accelerator input is applied by the driver and the condition of the road surface is unable to cope with the torque applied.

Feedback control methods are typically employed in such systems, whereby the slip of the driving wheels (wheel slip) is monitored and, when it becomes excessive due to an excessive driving torque (e.g. sudden application of the accelerator pedal), appropriate action is taken to reduce the engine output and/or to apply a braking force to the driving wheels. Traction control may be implemented within the engine control unit (ECU) of the vehicle to reduce engine torque by retarding or suppressing the spark to one or more cylinders of the engine, reducing fuel supply to one or more of the engine cylinders, closing the throttle, or, in turbo-charged vehicles, actuating the boost control solenoid to reduce boost and therefore engine power. Additionally, the wheel brake to one or more of the wheels may be applied to control wheel slip.

Traction control systems are typically implemented in a vehicle as part of a stability control system (SCS) operable to enhance stability of a vehicle by detecting and reducing skidding. If a skid is detected whilst cornering, the stability control system is arranged automatically to apply braking to individual wheels to assist a driver in steering the vehicle in an intended direction, for example around a corner.

A problem has been found with existing traction control systems that the length of time it takes for the wheel slip measurements (or values) to be calculated and processed within the ECU, and the additional system response limitations relating to generating brake pressure and/or implementing a torque reduction or torque increase of the powertrain, may not allow a fast enough response under certain driving conditions to achieve optimum control and/or refinement. For example, in a rear wheel drive vehicle it has been found that stability loss can occur within the time frame (approximately 300 ms) for which the wheel slip values are being measured, processed and responded to. This can result in a loss of vehicle control under certain conditions if there is an onset of wheel slip during the processing time period.

It is an object of the invention to provide an improved control system for a vehicle which addresses the aforementioned problem.

STATEMENT OF THE INVENTION

Embodiments of the invention may be understood by reference to the appended claims.

According to an aspect of the present invention for which protection is sought, there is provided a control method for a vehicle travelling on a surface, the vehicle having a vehicle powertrain for generating and delivering power to the vehicle wheels. The method includes measuring one or more parameters associated with motion of the vehicle on the surface; calculating a wheel slip value based on one or more of the measured parameters; comparing the wheel slip value with a predetermined wheel slip threshold for wheel slip of the vehicle; identifying a wheel slip condition if the wheel slip value exceeds the wheel slip threshold; and reducing the torque applied by the powertrain to the vehicle wheels if a wheel slip condition is identified. The method further includes comparing one or more of the measured parameters with a predetermined threshold for said measured parameter that is indicative of a level at which wheel slip of the vehicle may occur; and in circumstances in which one or more of the measured parameters exceeds the predetermined threshold, controlling the torque applied by the powertrain to the vehicle wheels to prevent loss of traction of the wheels.

For the purpose of the following description, the step of reducing the torque if the wheel slip threshold is exceeded will be referred to as the first step, and the step of controlling the torque if one or more of the predetermined thresholds is exceeded will be referred to as the second step. Advantageously, the first and second steps are carried out in parallel with one another. When active, controlling the torque in accordance with the second step will precede the first step as the measurement and processing steps of the second step are of a "feed forward" nature, whereas the processing steps of the first step involve a slower response to a "feed back" measurement of wheel slip.

In one aspect of the invention for which protection is sought there is provided a control method for a vehicle travelling on a surface, the vehicle having a vehicle powertrain for generating and delivering power to the vehicle wheels, the method including: measuring one or more parameters associated with motion of the vehicle on the surface; comparing the or each of the measured parameters with a predetermined threshold for said measured parameter that is indicative of a level at which wheel slip of the vehicle may occur; and in circumstances in which one or more of the measured parameters exceeds the predetermined threshold, controlling the torque applied by the powertrain to the vehicle wheels to prevent loss of traction of the wheels.

In a further aspect of the invention for which protection is sought there is provided a control method for a vehicle travelling on a surface, the vehicle having a vehicle powertrain for generating and delivering power to the vehicle wheels, the method including: measuring one or more parameters associated with motion of the vehicle on the surface; comparing the or each of the measured parameters with a predetermined threshold for said measured parameter that is indicative of a level at which wheel slip of the vehicle may occur; and in circumstances in which one or more of the measured parameters exceeds the predetermined threshold, controlling the torque applied by the powertrain to the vehicle wheels to prevent wheel slip.

For the avoidance of doubt it is stated that reference to preventing wheel slip includes the taking of measures to prevent wheel slip. It is not a requirement that wheel slip is actually prevented in order that a method or apparatus falls within the scope of the invention for which protection is sought. It is to be understood that in some embodiments the method may prevent wheel slip. In some embodiments the method may prevent wheel slip above a threshold wheel slip value.

In an aspect of the invention for which protection is sought there is provided a control method for a vehicle travelling on a surface, the vehicle having a vehicle powertrain for generating and delivering power to the vehicle wheels, the method including: measuring one or more parameters associated with motion of the vehicle on the surface; comparing the or each of the measured parameters with a predetermined threshold for said measured parameter that is indicative of a level at which wheel slip of the vehicle may occur; and in circumstances in which one or more of the measured parameters exceeds the predetermined threshold, controlling the torque applied by the powertrain to the vehicle wheels to reduce a rate at which wheel slip may develop.

It is to be understood that in some embodiments the method involves the step of controlling the torque applied by the powertrain to the wheels to reduce a rate at which wheel slip may develop substantially to zero. Thus, optionally, the method includes controlling the torque applied by the powertrain to the vehicle wheels to prevent wheel slip.

It is to be understood that this "feed forward" step may be performed independently and in the absence of the "feed back" step described above in respect of the preceding aspect of the invention.

It is to be understood that the step of controlling the torque applied by the powertrain to the vehicle wheels to reduce a rate at which wheel slip may develop may comprise the step of controlling the torque applied by the powertrain to the vehicle wheels to reduce a rate at which wheel slip above a prescribed threshold value of wheel slip may develop. The threshold value may be a value responsive to one or more parameters.

The wheel slip may be a longitudinal slip, a lateral slip, a total net resultant slip or both a longitudinal slip and a lateral slip. The method may involve controlling the torque applied by the powertrain to maintain longitudinal slip below a longitudinal slip threshold and lateral slip below a lateral slip threshold. The threshold values of longitudinal and lateral slip may be interdependent; thus a threshold value of longitudinal slip may decrease as an amount of lateral slip experienced by a wheel increases, and a threshold value of lateral slip may decrease as an amount of longitudinal slip of a wheel increases.

It is to be understood that in some embodiments a motor vehicle traction control function is configured to prevent or reduce longitudinal wheel slip above a threshold value. Therefore in some embodiments reference to wheel slip may be understood to mean longitudinal wheel slip.

In some embodiments, in the case of a motor vehicle stability control function such as a yaw stability control function, reference to wheel slip may include reference to one or both of longitudinal and lateral wheel slip.

Advantageously the method further comprises:
calculating a wheel slip value based on one or more of the measured parameters;
comparing the wheel slip value with a predetermined wheel slip threshold for wheel slip of the vehicle;
identifying a wheel slip condition if the wheel slip value exceeds the wheel slip threshold; and
reducing the torque applied by the powertrain to the vehicle wheels if a wheel slip condition is identified.

This step may be referred to as a "feed back" step.

As noted above, in the case that both of the preceding steps are performed (i.e. the feed forward and feed back steps), the step of reducing the torque if the wheel slip threshold is exceeded will be referred to as the first step (feed back step), and the step of controlling the torque if one or more of the predetermined thresholds is exceeded will be referred to as the second step (feed forward step).

Advantageously, the first and second steps are carried out in parallel with one another. Again, when active, controlling the torque in accordance with the second step will precede the first step as the measurement and processing steps of the second step are of a "feed forward" nature, whereas the processing steps of the first step involve a slower response to a "feed back" measurement of wheel slip.

Advantageously, in circumstances in which one or more of the measured parameters exceeds its predetermined threshold, controlling the torque includes limiting the rate of torque increase applied by the powertrain to the vehicle wheels.

Typically, the system response time from the occurrence of wheel slip to implementation of an effective torque controlling response may be between 200 and 500 ms, and more typically around 300 ms. Within this timeframe, the present invention enables a degree of torque control by responding to a comparison between one or more of the measured parameters with a predetermined threshold for said measured parameter(s).

It is therefore an advantage of embodiments of the invention that the rate of torque increase may be limited even before a wheel slip value is generated as driving conditions in which a high rate of wheel slip generation would be detrimental are recognized quickly. During the time period in which the wheel slip calculation and comparison steps are carried out (the first step), the rate of torque increase applied to the vehicle wheels is limited by the second processing step, if necessary, to ensure that wheel slip is controlled. This avoids the possibility of loss of control such as traction control within the time period for which wheel slip values are being processed and responded to, as may occur in a conventional traction control system.

The control method of the invention therefore enables close control, under all circumstances, of the rate at which powertrain torque is applied to the vehicle wheels. Without the use of the invention, it is possible for the increase in engine torque to lag behind a powertrain torque control request issued by a feed back control function in order to reduce powertrain torque such as a 'traction control request', due to the response capability of the engine. If this happens, the engine may suddenly catch up with a driver-requested torque level at a very high torque increase rate. For example, when a turbo is "off boost" and there is a sudden demand for increased torque, a very high rate of torque increase may be experienced when the turbo suddenly comes "on boost". This problem is alleviated in some embodiments of the present invention because the rate of torque increase is limited, if necessary, without the need for a wheel slip value to be processed and responded to (feed back step). It is to be understood that a delay in increase in engine torque can similarly occur when a stability control function such as a yaw stability control function requests an increase in powertrain torque, resulting in a very high torque increase rate when the powertrain catches up with the request. In some implementations, the yaw stability function may issue a request in a similar manner to a traction control function in order to control the powertrain to prevent slip. The effect of the request may for example be to limit a powertrain torque rise rate as discussed above. The format of the request may be substantially the same whether a traction control function or a yaw stability control function makes the request. Thus in both cases a similar 'traction control request' may be made.

It will be appreciated that even with a limit applied to the rate of torque increase, the demanded torque will still be achieved at the vehicle wheels, but just within a longer time frame.

The step of limiting the rate of torque increase may comprise the step of limiting the rate of torque increase by an amount that is responsive to a determination as to how far a state of a vehicle has moved beyond a threshold for limiting the rate of torque increase.

The step of limiting the rate of torque increase may comprise the step of limiting the rate of torque increase by an amount responsive to a difference between a value of one or more of the measured parameters and the corresponding predetermined threshold value of the one or more measured parameters. The amount by which the rate of torque increase is limited may increase with the amount by which a value of the one or more measured parameters differs from the predetermined threshold value.

By way of example, the one or more parameters associated with vehicle motion over the surface may include one or more of:
lateral acceleration of the vehicle (a measure of the extent to which the vehicle is accelerating while cornering),
yaw rate of the vehicle (a measure of vehicle rotation),
linear acceleration of the vehicle,
a variation in vertical load on a wheel,
vehicle speed,
steering wheel input angle,
steering wheel input angle not corresponding to a straight ahead direction of travel,
steering wheel input rate, or angular velocity of the steering wheel,
oversteer,
understeer,
front axle sideslip;
rear axle side slip;
body side slip;
an amount by which powertrain torque is below a powertrain torque demand level; and
estimated friction of the surface on which the vehicle is travelling.

Reference to "understeer" is taken to mean that the application of a cornering force (lateral force) also applies a rotational torque (or moment) to the vehicle in the opposite direction to the direction in which the driver turns the steering wheel. In other words, understeer is a condition in which the vehicle does not follow the trajectory the driver is trying to impose while taking a corner, but instead follows a less curved trajectory. Understeer may be detected for example if vehicle yaw rate is below a target yaw rate, or if the actual steering input for a given cornering state is greater than expected.

Reference to "oversteer" is taken to mean that the application of cornering force (lateral force) also applies a rotational torque (or moment) to the car in the same direction as the direction in which the driver turns the steering wheel. The effect of oversteer is therefore opposite to that of understeer. Oversteer is a dynamically unstable condition so that, if control is lost, the vehicle will spin, whereas understeer is a dynamically stable condition. Oversteer may be detected for example if vehicle yaw rate is above a target yaw rate, or if the actual steering input for a given cornering state is less than expected.

In one embodiment, an amount by which powertrain torque is below a powertrain torque demand level is monitored in order to anticipate wheel slip. Monitoring an amount by which powertrain torque is below a powertrain torque demand level is useful because if powertrain torque is below demand level a risk exists that the powertrain torque may suddenly increase as the powertrain seeks to reduce the difference between demand level and actual level, increasing a risk of wheel slip, such as loss of traction. Thus the sudden increase may increase a risk of a loss of traction event.

In one embodiment, when a wheel of the vehicle slips a surface friction value is calculated. If the value is below a prescribed value the vehicle stores the value and may employ the value in controlling the vehicle (for example in calculations requiring as an input parameter a value of surface friction) until a higher surface friction value is found to be valid. A higher value of surface friction may be found to be valid responsive for example to a further wheel slip event or recognition that a wheel has not slipped when a force has been applied the value of which indicates a higher surface friction value.

Advantageously, the measurement of the wheel speed of all four wheels of the vehicle (in the case of a four wheeled vehicle) may be required to calculate the vehicle speed. Other numbers of wheel speed measurements are also useful, in the case of four wheeled vehicles and vehicles having a different number of wheels.

By way of example, if the lateral acceleration measurement indicates a potential loss of traction, the rate of torque increase will be limited by the second step of the method, during the period for which the wheel slip values are being determined and processed.

In another example, the method may include the step of calculating a road surface friction value and, if the road surface friction value is less than a predetermined friction value threshold (e.g. a friction value of 1, where 1 is representative of dry asphalt), the rate of torque increase applied by the powertrain to the vehicle wheels may be limited.

The friction of the surface on which the vehicle is travelling may be calculated as soon as it is detected that the vehicle wheels have started to slip.

Advantageously, the method includes, for the second processing step, limiting the rate of torque increase as described above in circumstances in which the two or more measured parameters exceed said predetermined thresholds. For the avoidance of doubt, in some embodiments only the second step referred to above is implemented in a vehicle and not the first step. In some embodiments both the first and second steps are implemented.

Since it is usual within the ECU to check all measured signals (e.g. lateral acceleration, yaw rate, linear acceleration) for plausibility, it is advantageous to set the criterion that two or more of the measured parameters exceed the predetermined thresholds before the rate of torque increase is limited. One or more of these parameters exceeding the predetermined threshold for said parameter can be used to infer that there is an increased risk of wheel slip and that a reduced rate of torque increase would enhance the system response capabilities.

The step of comparing a measured parameter with a predetermined threshold may involve comparing the measured parameter directly with a threshold for that parameter or, alternatively, may involve comparing a difference value between the measured parameter and a target value for the parameter with a difference value threshold for said parameter. In the latter case, the threshold referred to above is a difference value threshold, being the difference between a target value of the parameter and an acceptable maximum value of the parameter before which there is a risk of wheel slip.

The amount by which the rate of torque increase is limited may increase with the amount by which the difference value exceeds the difference value threshold.

In one embodiment, the threshold levels of each of the measured parameters, and/or the wheel slip threshold, may be varied in dependence on the nature of the surface on which the vehicle is travelling. For example, the threshold levels and/or the wheel slip threshold may be adjusted by user input of a selector device for selecting an appropriate surface characteristic, such as icy, wet or off-road.

In one embodiment the vehicle is configured to monitor a rate of increase of powertrain torque request by a driver, for example by reference to an accelerator pedal input of the vehicle. The vehicle may be configured to limit an output torque of the powertrain responsive to the rate of increase of driver powertrain torque request. In one embodiment the vehicle limits the rate of increase of powertrain output torque such that it does not exceed the rate of increase of driver demanded powertrain torque by more than a prescribed amount, optionally a substantially zero prescribed amount. Advantageously, limiting the rate of increase of powertrain output torque reduces a risk that powertrain output torque increases at a rate greater than that which a driver actually desires. This feature may be particularly useful for example where a driver finds that an initial response of the powertrain to an increase in driver demanded torque lags behind that demanded by the driver. The powertrain may attempt to 'catch up' rapidly with the driver demanded value, resulting in a rate of increase of powertrain output torque that greatly exceeds the rate of increase demanded initially by the driver. However the method still allows a rapid increase in powertrain torque once powertrain torque is available. Thus if a driver has increased the driver demanded torque relatively rapidly, a correspondingly rapid increase may be provided by the powertrain once the torque is available.

Advantageously the rate of torque increase may be limited when the vehicle undergoes one or more mode changes associated with vehicle operation, for example one or more powertrain mode changes. In one embodiment a rate of torque increase is limited when the number of wheels driven by the powertrain changes, for example when increasing the number of driven wheels. Thus if a transition is made from (say) a two wheel drive mode to (say) a four wheel drive mode the torque rise rate may be limited. This feature can be beneficial in reducing noise, vibration and harshness (NVH) and/or component wear. In one embodiment the torque rise rate is also limited when the number of driven wheels decreases.

In one embodiment the torque rise rate is limited when a driveline ratio value changes, being a gearing ratio between a prime mover and a driven wheel. Thus for example during a change of gear number or gear ratio of a transmission the torque rise rate may be limited. In some embodiments the torque rise rate may be limited when a transmission shifts to a lower gear ratio and/or when a transmission shifts to a higher gear ratio. In a vehicle having a plurality of prime movers torque rise rate may be limited if an actuator is coupled to the powertrain during a drivecycle or an actuator is decoupled from the powertrain during a drivecycle.

This feature may be employed to ensure that a delay in application of torque by a powertrain to one or more wheels of the vehicle does not result in an unexpectedly large surge in powertrain torque when torque becomes available from the powertrain following the change in gear (or the coupling or decoupling of an actuator from the powertrain). It is to be understood that when powertrain torque does become available the powertrain may be configured to increase the torque at a rate corresponding to that at which the corresponding driver torque demand increased, for example when an accelerator pedal was depressed.

It is to be understood that torque rise rate limitation (or other powertrain torque reduction strategy) may be deployed whilst a stability control system is operational. It is to be understood that a stability control system may demand a relatively high torque level in order to accelerate one or more wheels in order to regain stability, for example in applying a corrective torque to induce yaw of a vehicle in a required direction or following braking of one or more wheels to accelerate the wheel back to a required speed. If an increase in powertrain torque demand by a stability control system cannot be met by the powertrain when required, a sudden surge in powertrain torque may result when the powertrain 'catches up' with the torque value demanded by the stability control system. This problem can be eliminated or at least partially reduced by limiting a powertrain torque rise rate when a stability control system is in an active state. This can improve vehicle smoothness and quality of control during a stability control event.

In some embodiments a rate of change of torque rise rate is limited in order to control jerk.

The rate of torque increase may be limited by retarding or suppressing the spark to one or more cylinders of the engine, reducing the fuel supply to one or more of the cylinders, closing the throttle, or, in a turbo charged engine, actuating a boost control element such as a solenoid to reduce boost and therefore engine power. In the case of an electric machine operable as a traction motor the rate of torque increase may be limited by electronic control of the output torque. Any one or more of these strategies may also be used to reduce the torque applied by the powertrain to the vehicle wheels as a result of a wheel slip condition being identified.

The method of the invention is advantageously implemented in software on an Engine Control Unit (ECU) of the vehicle.

Optionally the step of controlling the torque applied by the powertrain to the vehicle wheels comprises the step of limiting a value of torque demanded from a powertrain by powertrain control means to a value offset by an amount above a current value of actual powertrain torque output. This step may be performed instead of or in addition to the step of limiting the rate of increase of powertrain torque (powertrain torque rise rate).

The amount of the offset may be determined responsive to the amount by which one or more of the measured parameters exceeds the predetermined threshold.

It is to be understood that an amount of driver-demanded powertrain torque may rise above an amount that the powertrain may deliver without wheel slip occurring. Thus, the value of torque that may be demanded of the powertrain may be limited to a value offset by an amount above the current value of torque demanded from the powertrain. This has the advantage that a risk that an amount of torque delivered by the powertrain increases to a level at which excessive wheel-slip occurs is reduced.

It is to be understood that powertrain torque may rise rapidly, for example due to a sudden increase in driver demanded torque, such that the vehicle is unable to request a reduction in powertrain torque (by means of a traction control or stability control system) in time to prevent wheel slip. By limiting the powertrain torque demand provided to control means of the powertrain, being a value of torque the control means will control the powertrain to deliver, to a value that is a prescribed amount above the current powertrain torque output value, a risk that the powertrain torque output reaches a value causing wheel slip may be reduced. In some embodiments this feature reduces a rate at which wheel slip may develop. Thus a risk that a relatively large surge in powertrain output torque occurs may be reduced, at least in part because the powertrain demanded torque may not exceed delivered output torque by more than the prescribed amount. The prescribed amount may be responsive to the one or more parameters associated with motion of the vehicle on the surface.

Thus a response by the powertrain to a driver demand for torque may be limited such that a control system of the vehicle has time to respond to the driver demand in order to reduce a rate at which wheel slip may develop, and in some arrangements prevent wheel slip occurring. Thus the powertrain is constrained to operate within response limitations associated with the ECU and system response limitations relating to generating brake pressure and/or implementing a torque reduction or torque increase of the powertrain, allowing optimum control and/or refinement of vehicle operation.

It is to be understood that some vehicle control systems allow a torque reduction request message to be provided to a powertrain controller such as an engine control unit (ECU). The message may correspond to a maximum value of powertrain torque that may be delivered by the powertrain at a given moment in time. If the torque reduction request value is below the current value of powertrain torque, the controller reduces the powertrain torque to the torque reduction request value. If the torque reduction request value is above the current value of powertrain torque, no action is taken to reduce powertrain torque.

Optionally, the limit value of powertrain torque may be increased at a rate that is itself limited whereby the rate of increase may not exceed a prescribed rate.

In some embodiments a maximum value of allowable powertrain torque is determined substantially continuously responsive to the value of the one or more parameters associated with motion of the vehicle on the surface. The maximum value may correspond to a value above which a risk of excessive wheel slip exists although other ways of defining the maximum value are also useful. The vehicle may be arranged to issue a torque reduction request (setting for example a maximum allowable value of powertrain torque) if it is determined that powertrain torque output may be about to exceed this value or a corresponding or related value thereby to control the torque applied by the powertrain to the vehicle wheels to prevent wheel slip, such as loss of traction of the wheels.

In some embodiments the torque reduction request value is set to ensure that any increase in powertrain torque above the maximum value occurs at a limited rate. The rate may be limited in some arrangements by increasing the torque reduction request value at a limited rate.

In some embodiments the method comprises adaptive filtering of powertrain torque according to the dynamic state of the vehicle. The dynamic state may be determined by reference to the one or more measured parameters. Adaptive filtering may therefore be performed in circumstances in which one or more of the measured parameters exceeds the predetermined threshold.

Thus powertrain torque may be filtered responsive to a value of the one or more measured parameters. A frequency response of the powertrain to an accelerator control input by a driver may therefore be modified. Low pass filtering may be employed in some arrangements.

In some embodiments, a torque request (demand) input from a driver is filtered such that an actual amount of torque requested of the powertrain does not follow that corresponding to driver demand immediately, but lags behind.

In one embodiment, a yaw stability control function or other stability control function is operable to monitor the one or more measured parameters which may include for example monitoring a steering response of the vehicle. If the response becomes non-linear by more than a prescribed amount the system may be arranged to control the torque applied by the powertrain to the wheels to prevent slip. In one embodiment the vehicle monitors an understeer recognition coefficient. If the understeer recognition coefficient indicates a prescribed amount of understeer has been exceeded, the system may be arranged to control the torque applied by the powertrain to the wheels to prevent slip.

In one embodiment the system imposes a torque rise rate limitation on powertrain output torque thereby to limit a rate at which powertrain output torque may rise, in order to prevent slip. This decreases a risk that a stability control system is unable to respond sufficiently quickly to an increase in powertrain torque that results in vehicle instability. In the case of a yaw stability control function the instability may be a yaw instability.

In an aspect of the invention for which protection is sought, there is provided a traction control system or apparatus for implementing the method of the invention described in a preceding aspect, the apparatus including means for measuring one or more parameters associated with motion of the vehicle on the surface, means for calculating a wheel slip value based on the or each measured parameter, means for comparing the wheel slip value with a predetermined wheel slip threshold for wheel slip of the vehicle and for identifying a wheel slip condition if the wheel slip value exceeds the wheel slip threshold; and means for reducing the torque applied by the powertrain to the vehicle wheels if a wheel slip condition is identified. The apparatus further includes means for comparing one or more of the measured parameters with a predetermined threshold for said measured parameter that is indicative of a level at which wheel slip of the vehicle may occur; and means for controlling the torque applied by the powertrain to the vehicle wheels in circumstances in which one or more of the measured parameters exceeds the predetermined threshold, thereby to prevent loss of traction of the wheels.

In a further aspect of the invention for which protection is sought there is provided a vehicle control apparatus for a vehicle travelling on a surface, the vehicle having a vehicle powertrain for generating and delivering power to the vehicle wheels, the apparatus including means for measuring one or more parameters associated with motion of the vehicle on the surface; means for comparing one or more of the measured parameters with a predetermined threshold for said measured parameter that is indicative of a level at which wheel slip of the vehicle may occur; and means for controlling the torque applied by the powertrain to the vehicle wheels in circumstances in which one or more of the measured parameters exceeds the predetermined threshold, thereby to prevent wheel slip.

In a further aspect of the invention for which protection is sought there is provided a vehicle control apparatus for a vehicle travelling on a surface, the vehicle having a vehicle powertrain for generating and delivering power to the vehicle wheels, the apparatus including means for measuring one or more parameters associated with motion of the vehicle on the surface; means for comparing one or more of the measured parameters with a predetermined threshold for said measured parameter that is indicative of a level at which wheel slip of the vehicle may occur; and means for controlling the torque applied by the powertrain to the vehicle wheels in circumstances in which one or more of the measured parameters exceeds the predetermined threshold, thereby to reduce a rate at which wheel slip may develop.

Advantageously the apparatus further comprises means for calculating a wheel slip value based on the or each measured parameter, means for comparing the wheel slip value with a predetermined wheel slip threshold for wheel slip of the vehicle and for identifying a wheel slip condition if the wheel slip value exceeds the wheel slip threshold; and means for reducing the torque applied by the powertrain to the vehicle wheels if a wheel slip condition is identified.

Preferably, the means for controlling the torque applied by the powertrain to the vehicle wheels in circumstances in which one or more of the measured parameters exceeds the predetermined threshold, includes means for limiting the rate of torque increased applied by the powertrain to the vehicle wheels.

The apparatus typically includes an Engine Control Unit (ECU) for performing the calculation and comparison steps of the invention.

The invention also extends to a computer program product comprising at least one computer program software portion which, when executed in an execution environment, is operable to implement one or more of the steps of a method according to a preceding aspect of the invention, and to a data storage medium having the or each computer software portion stored thereon. The invention also relates to a microcomputer provided with said data storage medium.

It is to be understood that embodiments of the invention find useful application in electric vehicles and hybrid electric vehicles as well as non-hybrid vehicles powered solely by an engine such as an internal combustion piston engine. In embodiments having an electric machine in addition to a fuel burning actuator such as an internal combustion engine reference to controlling a powertrain torque may include controlling an amount of torque delivered by one or more propulsion motors in addition to a fuel burning actuator. In some embodiments powertrain torque may be applied by one or more different actuators at one or more different times as required in order to provide a required powertrain response.

It is to be understood that torque rise rate limitation may be employed to prevent or reduce harshness due to abrupt changes in torque that may be obtained by means of electrical actuators such as electric motors or motor/generators.

According to an aspect of the present invention for which protection is sought, there is provided a traction control method for a vehicle travelling on a surface, the vehicle having a vehicle powertrain for generating and delivering power to the vehicle wheels, the method including: measuring one or more parameters associated with motion of the vehicle on the surface; calculating a wheel slip measurement based on one or more of the measured parameters; comparing the wheel slip measurement with a predetermined wheel slip threshold for wheel slip of the vehicle; identifying a wheel slip condition if the wheel slip measurement exceeds the wheel slip threshold; and reducing the torque applied by the powertrain to the vehicle wheels if a wheel slip condition is identified; characterized in that the method further includes; comparing the or each of the measured parameters with a predetermined threshold for said measured parameter that is indicative of a level at which wheel slip of the vehicle may occur; and in circumstances in which one or more of the measured parameters exceeds the predetermined threshold, controlling the torque applied by the powertrain to the vehicle wheels to prevent loss of traction of the wheels.

According to a further aspect of the invention for which protection is sought there is provided a traction control apparatus for a vehicle travelling on a surface, the vehicle having a vehicle powertrain for generating and delivering power to the vehicle wheels, the apparatus including means for measuring one or more parameters associated with motion of the vehicle on the surface, means for calculating a wheel slip measurement based on the or each measured parameter, means for comparing the wheel slip measurement with a predetermined wheel slip threshold for wheel slip of the vehicle and for identifying a wheel slip condition if the wheel slip measurement exceeds the wheel slip threshold; and means for reducing the torque applied by the powertrain to the vehicle wheels if a wheel slip condition is identified, characterized in that the apparatus further includes means for comparing one or more of the measured parameters with a predetermined threshold for said measured parameter that is indicative of a level at which wheel slip of the vehicle may occur; and means for controlling the torque applied by the powertrain to the vehicle wheels in circumstances in which one or more of the measured parameters exceeds the predetermined threshold, thereby to prevent loss of traction of the wheels.

It will be appreciated that preferred and/or optional features of the first aspect of the invention may be included within the second aspect of the invention, alone or in appropriate combination.

BRIEF DESCRIPTION OF THE DRAWINGS

In order that the invention may be more readily understood, reference will now be made, by way of example only, to the accompanying drawings in which.

DETAILED DESCRIPTION

Figure 1:
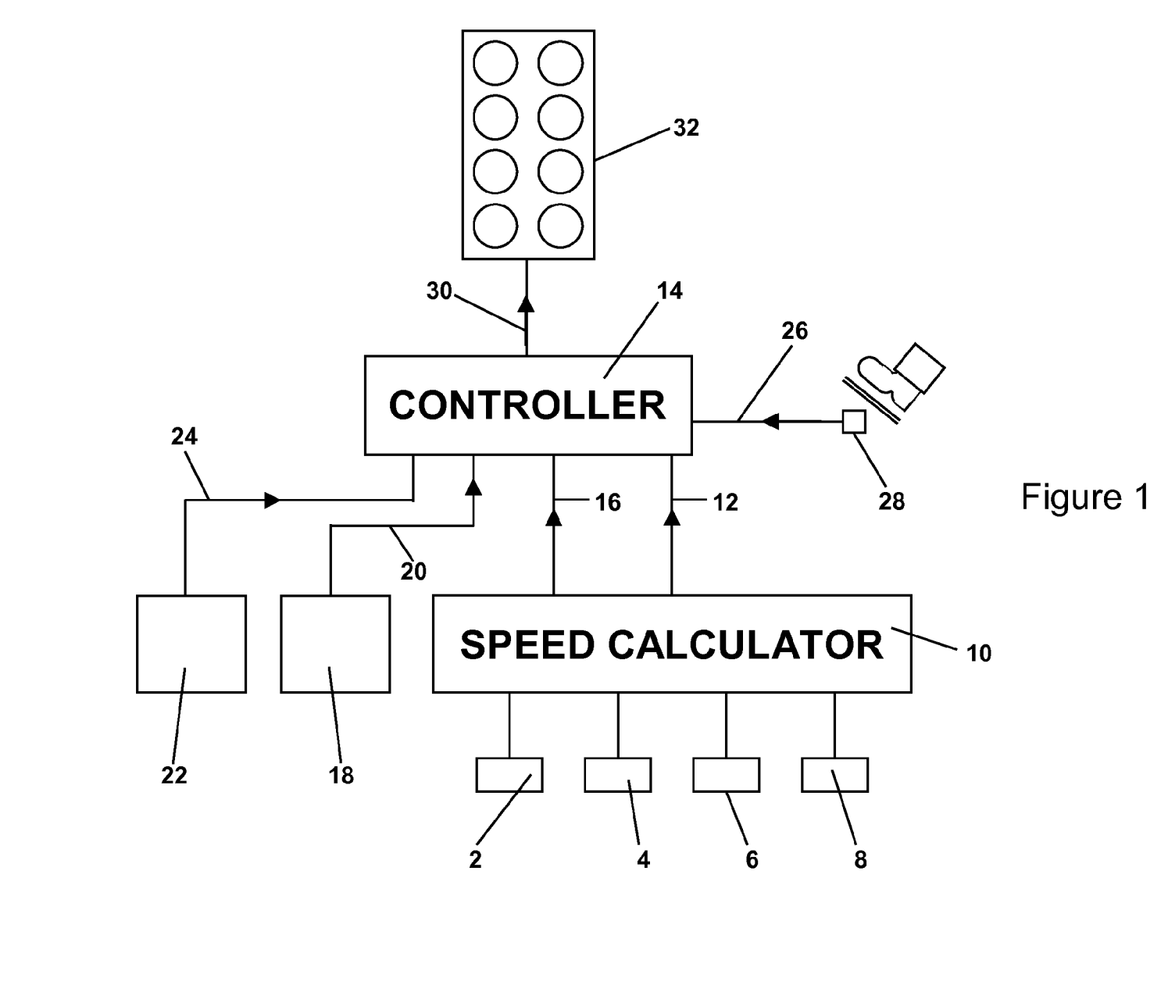
FIG. 1 is a schematic block diagram of a traction control system in accordance with an embodiment of the invention.

The traction control system in FIG. 1 is suitable for implementation in a vehicle having four driven wheels although it is to be understood that other numbers of driven wheels are also useful in some embodiments of the invention. The system includes four wheel sensors 2, 4, 6, 8, one for each of the wheels, and each of which is connected to a speed calculation means in the form of a vehicle speed calculator 10. The speed calculator 10 provides a first output signal 12 to provide a speed measurement to an Engine Control Unit (ECU), referred to as the controller 14. The speed calculator 10 also provides a value of wheel slip to the controller via a second output 16, as described below.

The vehicle is also provided with a plurality of sensors for measuring various parameters associated with motion of the vehicle across a surface. The vehicle includes a yaw rate sensor 18 which provides a third output signal 20 to the controller in the form of a vehicle rotation signal, and an acceleration sensor 22 which provides a fourth output signal 24 to the controller in the form of a lateral acceleration signal.

A driver demand signal 26 is supplied from a throttle pedal position sensor 28 to the controller 14, in response to which the controller supplies an engine torque demand signal 30 to a powertrain 32 of the vehicle to generate and deliver a demanded torque to the vehicle wheels. The engine torque demand signal 30 is used to modify the powertrain torque demand, for example by controlling a throttle of the engine or by applying a braking force to the driven wheels.

The speed calculator 10 is configured to determine a vehicle speed measurement by calculating vehicle speed as the speed of the slowest wheel or as an average of the speed of two or more wheels. Wheel slip is determined by comparing the individual wheel speeds with the calculated vehicle speed. The controller 10 stores a predetermined wheel slip threshold value and continually compares the wheel slip output signal 16 with the wheel slip threshold value to determine whether conditions require the torque to be modified to prevent wheel slip. If the value of the wheel slip output signal 16 exceeds the wheel slip threshold value, a wheel slip condition is identified and the torque applied by the powertrain to the vehicle wheels is modified to prevent the onset of wheel slip, or to prevent further wheel slip.

Figure 2:
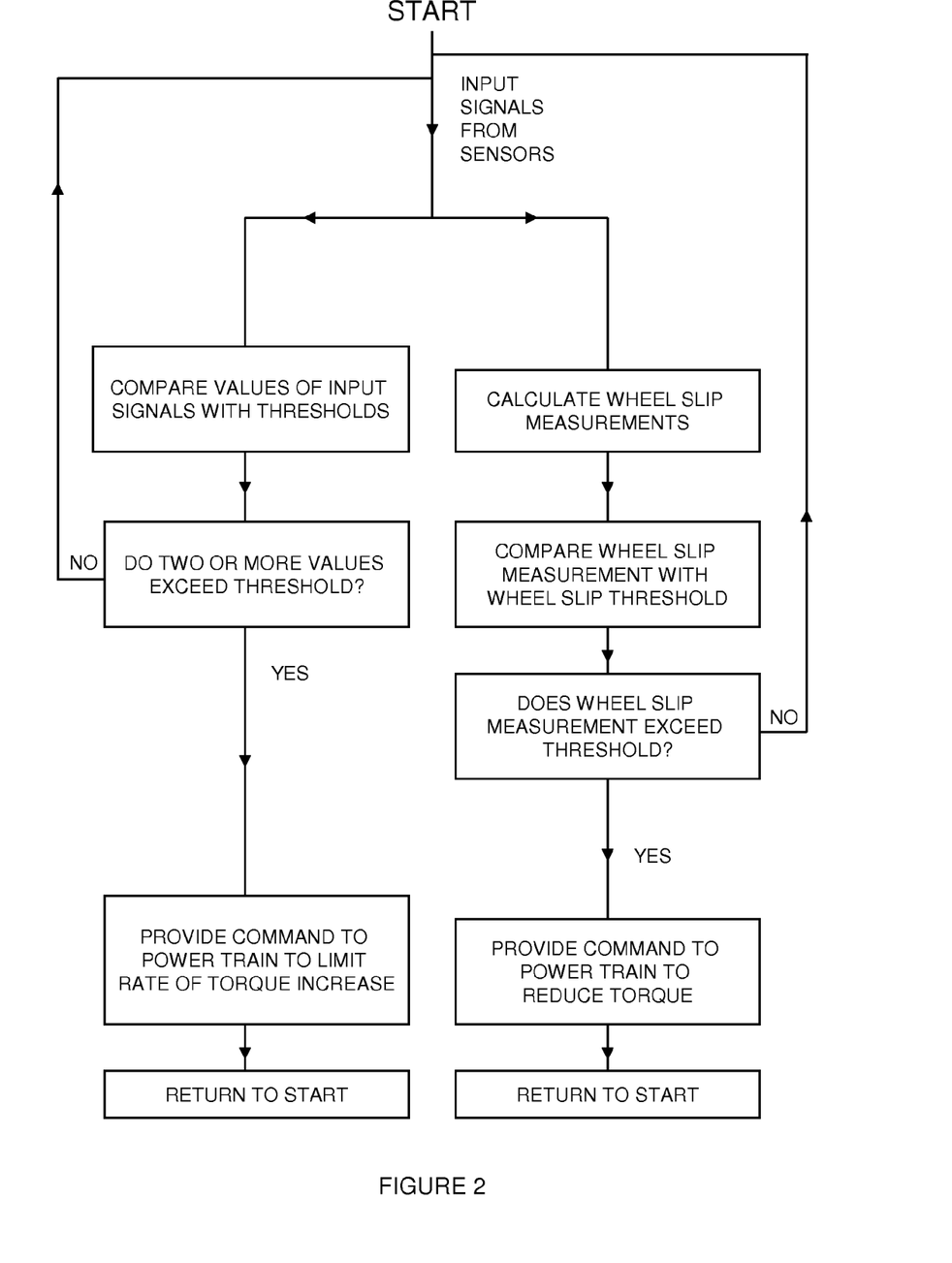
FIG. 2 is a flow diagram to illustrate the method steps implemented by the traction control system in FIG. 1.

The processing steps of a preferred embodiment of the invention are illustrated in the flow diagram of FIG. 2, and are as follows.

When the engine is in use, the controller 14 continually monitors the values of the input signals for vehicle speed, yaw rate and lateral acceleration. The controller 14 stores predetermined threshold values associated with each of these parameters, which thresholds represent the minimum acceptable level before which traction control may be required. In circumstances in which the measured parameters exceed the minimum threshold level, the torque applied to the vehicle wheels is controlled, for example by limiting the rate of increase in powertrain torque. This may be achieved, for example, by throttling the input to the engine and/or by applying a braking force to the wheels, so as to prevent loss of traction control.

In an alternative implementation, rather than comparing the values of the input signals directly with a threshold value for the parameter, the difference between the measured value of an input signal and a target value for said input signal may be compared with a predetermined difference value threshold which is indicative of the maximum difference from the target value which is considered to be safe before there is a risk of wheel slip. If the difference between the measured value of the input signal and the target value exceeds the predetermined difference value threshold, the rate of increase in powertrain torque is limited, for example by throttling the input to the engine and/or by applying a braking force to the wheels, so as to prevent loss of traction control.

Considering first the input signal 24 that is representative of lateral acceleration, the controller 14 compares the signal 24 with a lateral acceleration threshold and, if the threshold is exceeded (or the predetermined difference value threshold is exceeded), the output signal 30 to the powertrain 32 serves to limit the rate of torque increase within the powertrain 32, for example by limiting the throttle to the engine or by applying a braking force to the wheels. Likewise, considering the input signal 20 that is representative of yaw rate, the controller 14 compares the signal 20 with a yaw rate threshold and, if the threshold is exceeded, the output signal 30 to the powertrain again serves to limit the rate of torque increase within the powertrain 32. The controller 14 performs the comparison for all input signals 12, 16, 20, 24 that it receives and may be programmed to limit the rate of torque increase within the powertrain if any one or more of the signals exceeds the corresponding threshold.

In combination with the aforementioned method steps, the speed calculator 10 continually performs a calculation of vehicle speed and the controller 14 continually determines a wheel slip value on the basis of the speed measurements of the individual wheels. As illustrated in FIG. 2, these measurements are processed in parallel with the processing of the sensor signals 12, 16, 20, 24, and the comparison of these sensor signals 12, 16, 20, 24 with their respective thresholds, as described above.

There is a processing time delay during which the speed calculator 10 firstly determines vehicle speed, and secondly in which the controller 14 calculates wheel slip on the basis of the vehicle speed measurements and then compares the wheel slip value with the wheel slip threshold. If, during the time period for which the wheel slip calculation and comparison steps are still being processed a wheel slip condition occurs, this may result in a loss of stability control. However, if during this time delay period it is determined that the lateral acceleration signal 24 has exceeded the lateral acceleration threshold value, and/or that the yaw rate signal 20 has exceeded the yaw rate threshold value, the rate of torque increase within the powertrain will still be limited. In this way any potential loss of stability which may otherwise occur whilst the wheel slip value calculation and comparison steps are being processed and implemented is avoided, and traction control of the vehicle is improved.

In a further refinement, the vehicle may also be provided with a longitudinal acceleration sensor which can provide additional information about road pitch to the controller and provides another source of measurement of vehicle acceleration and speed. A vehicle roll rate sensor may also be provided. Outputs from the longitudinal acceleration sensor and/or the roll rate sensor are provided to the controller and may be used to initiate the step of limiting the rate of powertrain torque increase in a similar manner as described above.

It will be understood that the embodiments described above are given by way of example only and are not intended to limit the invention, embodiments of which may be understood by reference to the appended claims. It will also be understood that the embodiments described herein may be used individually or in combination.

The invention claimed is:

1. A control method for a wheeled vehicle travelling on a surface, the vehicle having a vehicle powertrain for generating and delivering power to the vehicle wheels, the method comprising:
   measuring at least one parameter associated with motion of the vehicle;
   determining a relationship between the at least one measured parameter and a predetermined threshold that is indicative of a level at which wheel slip of the vehicle may occur; and
   controlling a rate at which torque applied by the powertrain to at least one of the vehicle wheels may be changed based on the determined relationship to reduce a rate at which wheel slip may develop.

2. The method of claim 1, wherein the controlling comprises controlling the rate at which the torque applied by the powertrain to the at least one of the vehicle wheels may increase based on the determined relationship.

3. The method of claim 1, wherein the controlling comprises limiting a rate of torque increase by an amount that is based on a determination regarding how far a state of a vehicle has moved beyond a threshold for limiting the rate of torque increase.

4. The method of claim 1, wherein the controlling comprises limiting a rate of torque increase by an amount based upon a difference between a value of the at least one measured parameter and the predetermined threshold.

5. The method of claim 4, wherein the controlling comprises controlling an amount by which the rate of torque increase is limited based on a relationship between a value of the at least one measured parameter and the predetermined threshold.

6. The method of claim 1, comprising
determining a wheel slip value;
reducing the torque applied by the powertrain to the at least one vehicle wheel if the determined wheel slip value exceeds a wheel slip threshold.

7. The method of claim 6, comprising
using the determined wheel slip value to control wheel slip in a feedback control manner; and
using the measured at least one parameter and the determined relationship in a feed forward control manner.

8. The method of claim 6, comprising
determining the wheel slip value based on the at least one measured parameter associated with motion of the vehicle.

9. The method of claim 6, wherein the wheel slip threshold is varied based on a condition of terrain on which the vehicle is travelling.

10. The method of claim 6, wherein at least one of the predetermined threshold or the wheel slip threshold is adjusted by user input based on a surface on which the vehicle is travelling.

11. The method of claim 1, wherein the at least one measured parameter comprises at least one of
lateral acceleration of the vehicle,
yaw rate of the vehicle,
linear acceleration of the vehicle,
a variation in vertical load on a wheel,
speed of the vehicle,
steering wheel input angle,
steering wheel input angle not corresponding to a straight ahead direction of travel,
angular velocity of the steering wheel of the vehicle,
oversteer,
understeer,
front axle sideslip;
rear axle side slip;
body side slip;
an amount by which powertrain torque is below a powertrain torque demand level; and
estimated friction of the surface on which the vehicle is travelling.

12. The method of claim 1 comprising varying the predetermined threshold based on a condition of terrain on which the vehicle is travelling.

13. The method of claim 1, wherein the controlling comprises one or more of:
(i) retarding or suppressing spark to one or more cylinders of the engine,
(ii) reducing fuel supply to one or more of the cylinders,
(iii) applying a brake to the at least one of the vehicle wheels,
(iv) closing a throttle,
(v) actuating a boost control solenoid to reduce engine power of a turbo charged engine, and
(vi) electronically controlling output torque of an electrical machine.

14. The method of claim 1, wherein the controlling occurs independent of determining that wheel slip exists.

15. A device for controlling a wheeled vehicle travelling on a surface, the vehicle having a vehicle powertrain for generating and delivering power to vehicle wheels, the device comprising:
at least one sensor for measuring at least one parameter associated with motion of the vehicle; and
at least one controller configured to
determine a relationship between the at least one measured parameter and a predetermined threshold that is indicative of a level at which wheel slip of the vehicle may occur; and
control a rate at which torque applied by the powertrain to at least one of the vehicle wheels may be changed based on the determined relationship to reduce a rate at which wheel slip may develop.

16. The device of claim 15, wherein the at least one controller is configured to control the rate at which the torque applied by the powertrain to the at least one of the vehicle wheels may increase based on the determined relationship.

17. The device of claim 15, wherein the at least one controller is configured to limit a rate of torque increase by an amount that is based on a determination regarding how far a state of a vehicle has moved beyond a threshold for limiting the rate of torque increase.

18. The device of claim 15, wherein the at least one controller is configured to limit a rate of torque increase by an amount based upon a difference between a value of the at least one measured parameter and the predetermined threshold.

19. The device of claim 15, wherein the at least one controller is configured to control an amount by which the rate of torque increase is limited based on a relationship between a value of the at least one measured parameter and the predetermined threshold.

20. The device of claim 15, wherein the at least one controller is configured to
determine a wheel slip value; and
reduce the torque applied by the powertrain to the at least one vehicle wheel if the determined wheel slip value exceeds a wheel slip threshold.

21. The device of claim 20, wherein the at least one controller is configured to
use the determined wheel slip value to control wheel slip in a feedback control manner; and
use the measured at least one parameter and the determined relationship in a feed forward control manner.

22. The device of claim 20, wherein the at least one controller is configured to vary the wheel slip threshold based on a condition of terrain on which the vehicle is travelling.

23. The device of claim 20, wherein the at least one controller is configured to adjust at least one of the predetermined threshold or the wheel slip threshold is adjusted based on user input regarding a surface on which the vehicle is travelling.

24. The device of claim 15, wherein the at least one controller is configured to vary the predetermined threshold based on a condition of terrain on which the vehicle is travelling.

25. The device of claim 15, wherein the at least one controller is configured to control the rate at which torque applied to the at least one wheel may be changed independent of determining that wheel slip exists.

26. A vehicle, comprising
a plurality of wheels;
a vehicle powertrain for generating and delivering power to the wheels;
at least one sensor for measuring at least one parameter associated with motion of the vehicle; and
at least one controller configured to
determine a relationship between the at least one measured parameter and a predetermined threshold that is indicative of a level at which wheel slip of the vehicle may occur; and
control a rate at which torque applied by the powertrain to at least one of the vehicle wheels may be changed based on the determined relationship to reduce a rate at which wheel slip may develop.

27. The vehicle of claim 26, wherein the at least one controller is configured to control the rate at which torque applied to the at least one wheel may be changed independent of determining that wheel slip exists.

28. A control method for a wheeled vehicle travelling on a surface, the vehicle having a vehicle powertrain for generating and delivering power to the vehicle wheels, the method comprising:
- measuring one or more parameters associated with motion of the vehicle on the surface;
- comparing the or each of the measured parameters with a predetermined threshold for said measured parameter that is indicative of a level at which wheel slip of the vehicle may occur;
- in circumstances in which one or more of the measured parameters exceeds the predetermined threshold, controlling the torque applied by the powertrain to the vehicle wheels to reduce a rate at which wheel slip may develop;
- calculating a wheel slip value based on one or more of the measured parameters;
- comparing the wheel slip value with a predetermined wheel slip threshold for wheel slip of the vehicle; and
- reducing the torque applied by the powertrain to the vehicle wheels if the wheel slip value exceeds the wheel slip threshold.

* * * * *

UNITED STATES PATENT AND TRADEMARK OFFICE
CERTIFICATE OF CORRECTION

| | | |
|---|---|---|
| PATENT NO. | : 8,751,131 B2 | Page 1 of 1 |
| APPLICATION NO. | : 13/309969 | |
| DATED | : June 10, 2014 | |
| INVENTOR(S) | : Timothy Reynolds | |

It is certified that error appears in the above-identified patent and that said Letters Patent is hereby corrected as shown below:

IN THE CLAIMS:

In claim 13, column 15, line 46, delete "the" and insert --an--

In claim 23, column 16, line 40, delete "is adjusted"

Signed and Sealed this
Nineteenth Day of May, 2015

Michelle K. Lee
*Director of the United States Patent and Trademark Office*